United States Patent
Berry et al.

(10) Patent No.: US 9,514,265 B2
(45) Date of Patent: *Dec. 6, 2016

(54) CONGESTION AWARE LAYER PROMOTION

(71) Applicant: International Business Machines Corporation, Armonk, NY (US)

(72) Inventors: Christopher J. Berry, Red Hook, NY (US); Lakshmi Reddy, Briarcliff Manor, NY (US); Sourav Saha, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/542,824

(22) Filed: Nov. 17, 2014

(65) Prior Publication Data

US 2015/0347662 A1 Dec. 3, 2015

Related U.S. Application Data

(63) Continuation of application No. 14/288,885, filed on May 28, 2014.

(51) Int. Cl.
*G06F 17/50* (2006.01)
(52) U.S. Cl.
CPC ....... *G06F 17/5077* (2013.01); *G06F 17/5081* (2013.01); *G06F 2217/84* (2013.01)
(58) Field of Classification Search
USPC ........................................................ 716/129
See application file for complete search history.

(56) References Cited

U.S. PATENT DOCUMENTS

2007/0028201 A1* 2/2007 Mehrotra ............ G06F 17/5077 716/129
2007/0101303 A1* 5/2007 Lien .................... G06F 17/5077 716/52

OTHER PUBLICATIONS

List of IBM Patents or Patent Applications Treated as Related; (Appendix P), Filed Nov. 19, 2014; 2 pages.

(Continued)

*Primary Examiner* — Paul Dinh
*Assistant Examiner* — Bryce Aisaka
(74) *Attorney, Agent, or Firm* — Cantor Colburn LLP; Margaret McNamara

(57) ABSTRACT

Embodiments relate to managing layer promotion of interconnects in the routing phase of integrated circuit design. An aspect includes a system to manage layer promotion in a routing phase of integrated circuit design. The system includes a memory device to store instructions, and a processor to execute the instructions to identify a set of candidate interconnects for layer promotion, score and sort the set of candidate interconnects according to a respective score to thereby establish a respective rank, assess routing demand and resource availability based on layer promotion of the set of candidate interconnects, and manage the set of candidate interconnects based on the respective rank and the resource availability, the processor assessing the routing demand and resource availability and managing the set of candidate interconnects iteratively, wherein the processor, in at least one iteration, generates a second set of candidate interconnects by reducing the set of candidate interconnects.

6 Claims, 4 Drawing Sheets

(56) References Cited

OTHER PUBLICATIONS

Christopher J. Berry et al., "Congestion Aware Layer Promotion", U.S. Appl. No. 14/288,885, filed May 28, 2014.
Christopher J. Berry et al., "Physical Aware Technology Mapping in Synthesis", U.S. Appl. No. 14/288,794, filed May 28, 2014.
Christopher J. Berry et al., "Physical Aware Technology Mapping in Synthesis", U.S. Appl. No. 14/547,324, filed Nov. 19, 2014.
List of IBM Patents or Patent Applications Treated as Related; (Appendix P), Filed May 27, 2016; 2 pages.
Christopher J. Berry et al., "Physical Aware Technology Mapping in Synthesis", U.S. Appl. No. 15/166,322, filed May 27, 2016.
List of IBM Patents or Patent Applications Treated as Related; (Appendix P), Filed Jun. 1, 2016; 2 pages.
Christopher J. Berry et al., "Physical Aware Technology Mapping in Synthesis", U.S. Appl. No. 15/169,924, filed Jun. 1, 2016.

\* cited by examiner

CONGESTION AWARE LAYER PROMOTION

DOMESTIC BENEFIT/NATIONAL STAGE INFORMATION

This application is a continuation of U.S. application Ser. No. 14/288,885 filed May 28, 2014, the disclosure of which is incorporated by reference herein in its entirety.

BACKGROUND

The present invention relates generally to the routing phase of integrated circuit design, and more specifically, to congestion aware layer promotion.

Typically, integrated circuit (chip) design includes synthesis, placement, and routing stages that may be performed iteratively to develop the final design for fabrication of the integrated circuit. The design may be organized into equal-sized grids that each include a number of components such as transistors. The routing stage places interconnects between transistors within and among the various grids. These interconnects are placed in layers with the lowest (and generally slowest) layer being closest to the device and the highest (and generally fastest) layer being closest to the packaging of the chip.

One of the important design considerations is timing constraints. That is, the signals carried by the various interconnects must reach their intended destinations within specified timing requirements for the integrated circuit to function properly. The iterative process is undertaken in integrated circuit design in large part to ensure that the timing constraints are adhered to. During that process, one of the techniques that may be used to improve the timing of some interconnects is layer promotion. Layer promotion refers to moving or "promoting" an interconnect to a higher (and faster) level to improve timing.

SUMMARY

According to an embodiment, a system to manage layer promotion in a routing phase of integrated circuit design includes a memory device configured to store instructions; and a processor configured to execute the instructions to identify a set of candidate interconnects for layer promotion, score and sort the set of candidate interconnects according to a respective score to establish a respective rank, assess routing demand and resource availability based on layer promotion of the set of candidate interconnects, and manage the set of candidate interconnects based on the respective rank and the resource availability, the processor assessing the routing demand and resource availability and managing the set of candidate interconnects iteratively, wherein the processor, in at least one iteration, generates a second set of candidate interconnects by reducing the set of candidate interconnects.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments described herein relate to congestion aware layer promotion. Specifically, the degree of deficiency in meeting timing requirements and the degree to which decisions in the placement stage affect timing are considered in determining which interconnects to promote to a higher layer.

As noted above, layer promotion increases the speed of the promoted interconnects. However, other considerations may prevent the application of layer promotion to every interconnect whose timing may suggest that layer promotion is needed. One of these considerations is congestion. Thus, if every interconnect seemingly requiring layer promotion is moved to a higher layer, that higher layer may become congested to the detriment of timing and other parameters in that layer. As a result, layer promotion may be regarded as a limited resource.

Current routing and layer promotion methodologies may promote interconnects based on the amount of timing improvement expected based on the layer promotion. This approach fails to address issues such as, for example, those in the placement stage that may be responsible for the timing. That is, in the case of some interconnects, modifying placement in a subsequent iteration of the placement stage may partly or entirely mitigate the timing deficiency. These interconnects may then be removed from the set of candidate interconnects that indicate a need for layer promotion. On the other hand, as the design of the integrated circuit progresses and there is less flexibility for placement changes in consideration of all the other design objectives, more of the interconnects that may benefit from timing improvement based on placement changes may instead rely on layer promotion. Embodiments detailed below facilitate consideration of not only the need for layer promotion, with regard to timing, but also the possibility that layer promotion may be avoided by instead mitigating placement-based timing issues.

Figure 1:
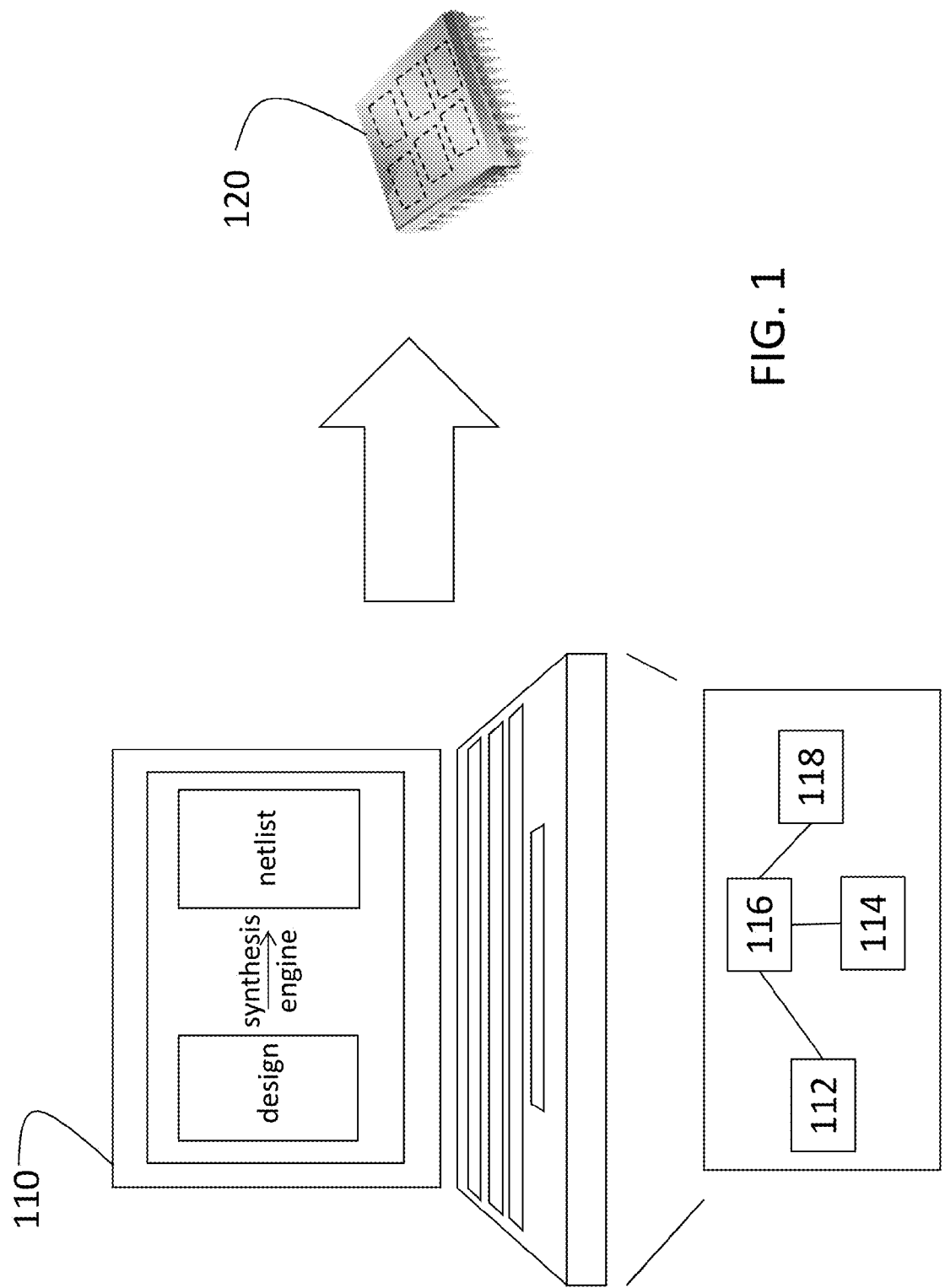
FIG. 1 is a block diagram of a system to synthesize a design for an integrated circuit according to an embodiment of the invention.

FIG. 1 is a block diagram of a system to synthesize a design for an integrated circuit according to an embodiment of the invention. A processing system 110 (e.g., computer or computer system) may implement the synthesis engine (to perform the synthesis, placement, and routing stages) in one or more processors 116. An input interface 112 (e.g., keyboard, mouse) may be used to develop the logic design (from a register transfer level or RTL description of the design) which is stored in one or more memory devices 114 of the processing system 110. An output interface 118 (e.g., display, output port) may be used to display a netlist resulting from the synthesis or provide the information to place and route components of the physical implementation 120 (e.g., chip). The physical implementation 120 includes creating components (e.g., transistors, resistors, capacitors) and interconnections (interconnect 310, FIG. 3) there between on a semiconductor (e.g., silicon wafer). The embodiments described below may be implemented by the processor 116 executing instructions stored in the memory device 114.

Figure 2:
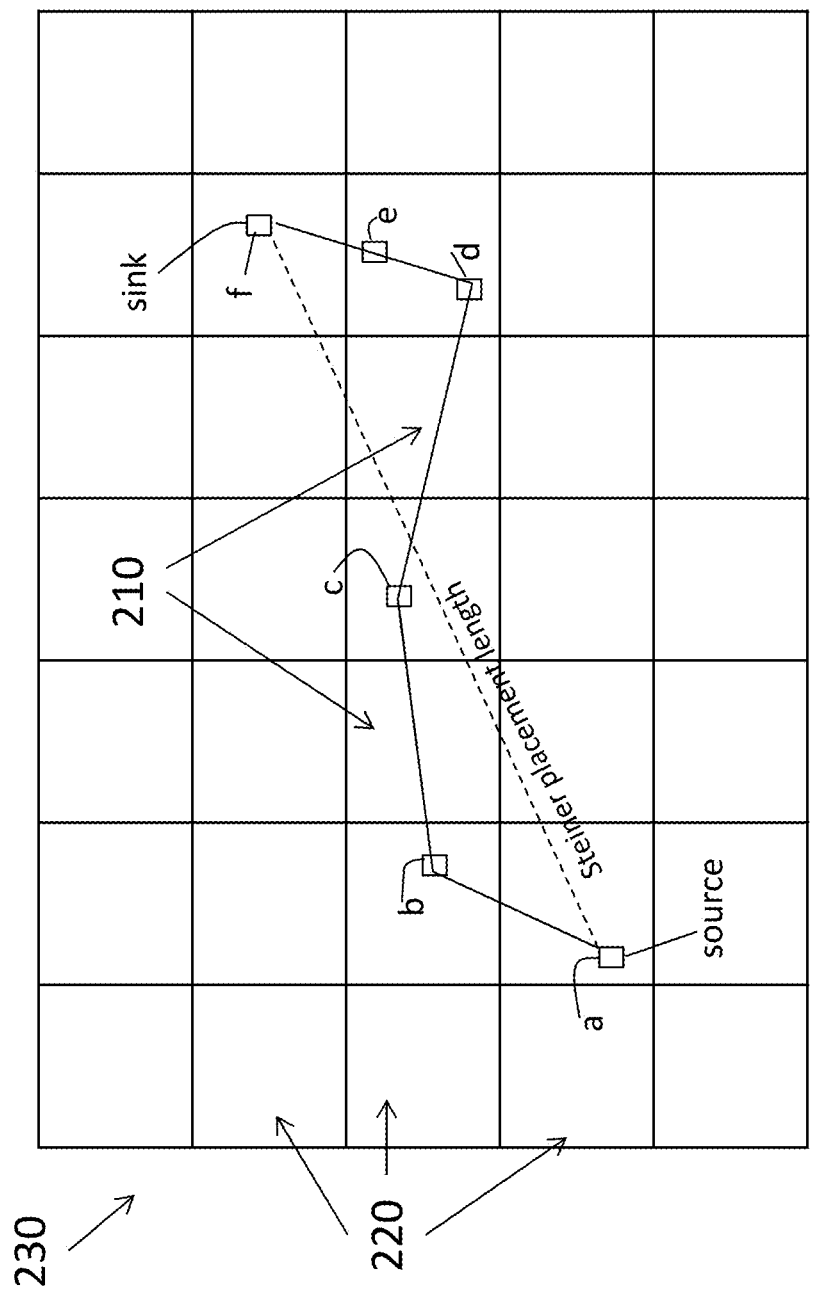
FIG. 2 is an exemplary design block of a physical implementation of the integrated circuit.

FIG. 2 is an exemplary design block 230 of a physical implementation 120 of the integrated circuit. The design block 230 is organized into tiles or grids 220 that each includes multiple components. Interconnects 210 are routed among the components to carry signals within or among grids 220. The example shown in FIG. 2 is of interconnects 210 from component a (signal source) to component f (signal sink) that go through components b, c, d, and e. The Steiner placement length indicated by the dashed line represents the shortest possible connection between the source and sink. That is, if the components b, c, d, and e were placed (in the placement stage) along the dashed line instead of as shown in FIG. 2, then the sum of the lengths of the interconnects 210 between component a (source) and component f (sink) would be as small as possible. Thus, as noted above, the ability to modify placement may mitigate the deficiencies of some interconnects 210 in meeting timing requirements. Placement is a consideration in deciding which interconnects 210 to move (through layer promotion) according to embodiments discussed further below.

Figure 3:
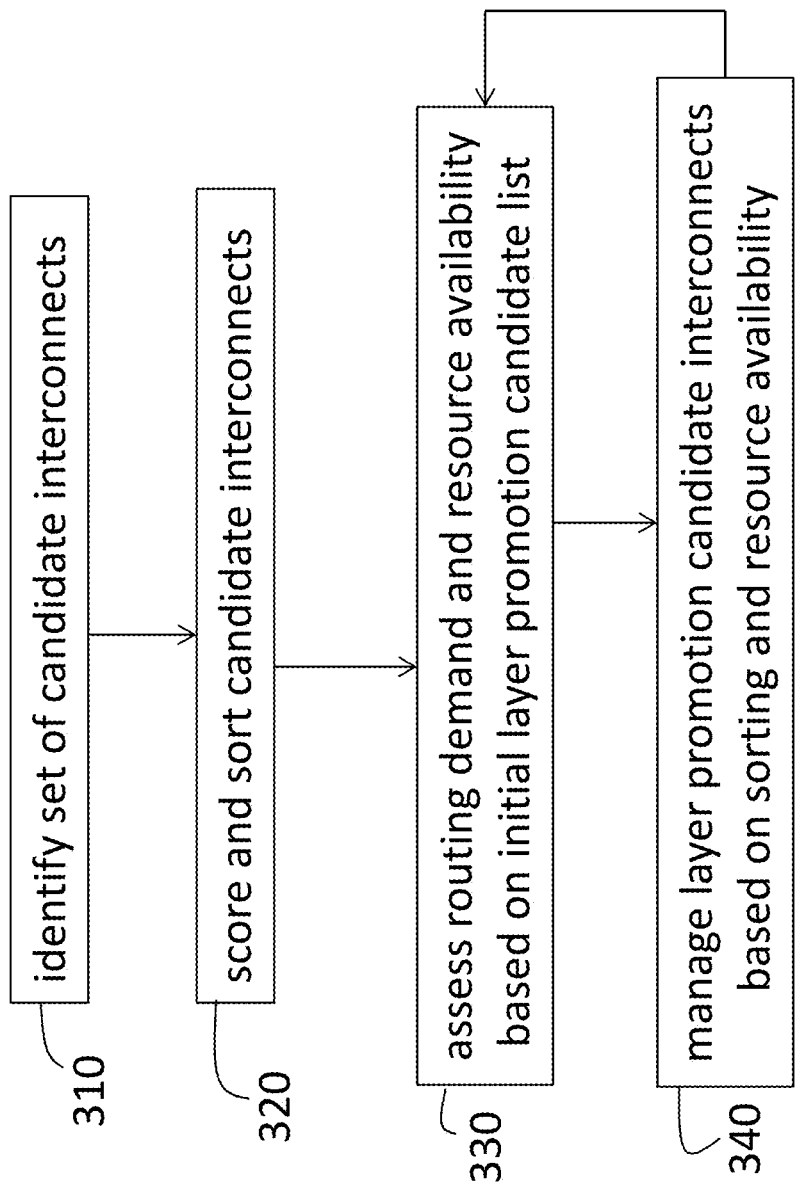
FIG. 3 is a process flow of a method of managing layer promotion according to embodiments of the invention.

FIG. 3 is a process flow of a method of managing layer promotion according to embodiments of the invention. It should be noted that the processes shown in FIG. 3 are in the routing phase of design which itself is iterative with the synthesis and placement phases to develop the final design for fabrication of the physical implementation 120 or chip. At block 310, identifying a set of candidate interconnects 210 includes identifying interconnects 210 that meet a specified slack improvement threshold. The slack improvement threshold is a minimum amount of timing improvement that must result from layer promotion (at a minimum) for a given interconnect 210 in order for that interconnect 210 to be considered a candidate for layer promotion. By using the slack improvement threshold to select the candidate interconnects 210, interconnects 210 that are not expected to exhibit a (sufficient) timing improvement as a result of layer promotion are prevented from using up the limited resource that layer promotion represents. At block 320, scoring and sorting the candidate interconnects 210 is further detailed below. The scoring involves two factors, a timing improvement factor and a placement factor, and the two factors are weighted differently based on the development stage of design in which the routing phase is being performed. The sorting is according to the score such that a ranking based on the score is established for the candidate interconnects 210.

At block 330, assessing the routing demand and resource availability based on the initial (current) layer promotion candidate list is done on a per grid 220 basis. This process involves determining the congestion and other effects resulting from promoting every interconnect 210 among the candidate interconnects 210 for layer promotion. This analysis does not involve actually moving or upgrading any of the routing but provides information about demand and availability trade-off through what can be thought of as a hypothetical promotion of all the candidate interconnects 210. To be clear, in view of the fact that the routing phase is still part of the design stage and not the physical fabrication, "actually moving" interconnects 210 or promoting interconnects 210 as opposed to hypothetically promoting interconnects 210 for analysis still refers to moving interconnects in an iteration of the design. The assessment at block 330 indicates whether all the candidate interconnects 210 may, in fact, be promoted to a higher layer or if some number of interconnects 210 fewer than all the candidate interconnects 210 may be promoted instead. This assessment is on a per-grid 220 basis, because congestion and resource availability are best addressed in a localized context rather than over a full path from source to sink traversing multiple grids 220. At block 340, the process includes managing layer promotion of the candidate interconnects 210 based on the sorting (done at block 320) and resource availability (determined at block 330). The managing at block 340 involves pruning interconnects 210 from the candidate interconnects 210 for layer promotion when the process at block 330 indicates that there are insufficient resources to facilitate layer promotion for all candidate interconnects 210. The pruning is according to the ranking established by the process at block 320. As indicated in FIG. 3, the processes at blocks 330 and 340 are performed iteratively. Thus, after a pruned (smaller) set of candidate interconnects 210 is generated at block 340, the assessment is performed again at block 330 to determine if the pruned set of candidate interconnects 210 may all be promoted or if additional (or less) pruning is required by performing the process at block 340 again. Less pruning (the recovery of some of the previously discarded candidate interconnects 210) may be warranted based on an assessment that resources are left over after accommodating the pruned set of candidate interconnects 210. The scoring and sorting to rank the candidate interconnects is further detailed below.

The score given to a given candidate interconnect 210 is as follows:

$$\text{score} = \text{scaling}_t * \text{t\_metric} + \text{scaling}_p * \text{p\_metric} \qquad [\text{EQ. 1}]$$

The t_metric refers to a metric reflecting the timing deficiency associated with the candidate interconnect 210. The timing deficiency is the amount of time by which the candidate interconnect 210 fails its timing requirement (failure_amount). The t_metric is given by:

$$\frac{\text{failure\_amount}}{\text{highest\_failure\_amount}} \qquad [\text{EQ. 2}]$$

The highest_failure_amount refers to the largest failure_amount among candidate interconnects 210 within the grid 220 of the candidate interconnect 210. As EQ. 2 indicates, when the candidate interconnect 210 failure_amount is the highest_failure_amount in the grid 220, then the result of EQ. 2 would be equal to 1. That is, t_metric for the candidate interconnect 210 that has the failure_amount that is the highest_failure_amount in the grid 220 is 1. The result of EQ. 2 for every other candidate interconnect 210 in that grid 220 would be some number less than 1. The p_metric refers to a metric reflecting the placement issues that affect timing of a candidate interconnect 210. Like t_metric, p_metric is based on a per-grid perspective. The value of p_metric is given by:

$$\frac{\text{placement\_ratio}}{\text{maximum\_placement\_ratio}} \qquad [\text{EQ. 3}]$$

The placement_ratio is explained with reference to FIG. 4.

Figure 4:
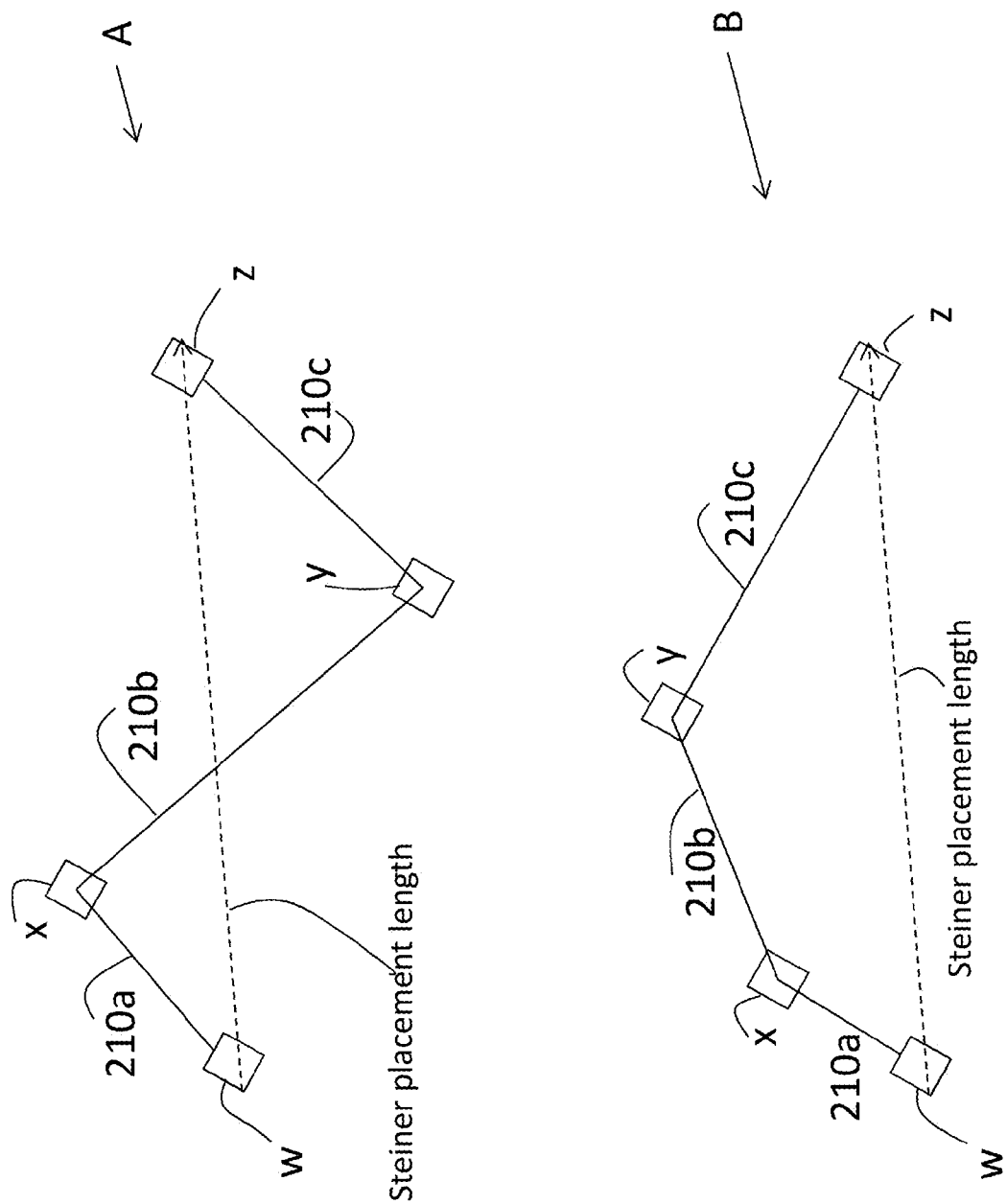
FIG. 4 illustrates placement effect on timing.

FIG. 4 illustrates placement effect on timing. The interconnects 210a, 210b, 210c between component w and component z depict a path (or subset of a path centered around the interconnect 210 for which p_metric is being computed) within a given grid 220 and are shown under two different scenarios A and B. In scenario A, because of the placement of components x and y, the length of interconnect 210b is longer than in scenario B. Thus, a modification in placement from the one shown as scenario A to the one shown as scenario B would lead to a decrease in the length of interconnect 210 *b* and, consequently, an improvement in the timing required for the interconnect 210*b*. The effect of placement on the timing is expressed through the placement_ratio given by:

$$\frac{\sum (\text{length}(210a, 210b, 210c))}{\text{Steiner\_placement\_length}} \quad [\text{EQ. 4}]$$

As FIG. 4 illustrates, the sum of the path or the sum of the lengths of the interconnects 210*a*, 210*b*, 210*c* is longer in scenario A than in scenario B. The Steiner_placement length is the shortest length between components w and z. If components x and y were placed (during the placement phase) along the dotted line indicating the Steiner placement length in FIG. 4, then placement_ratio would have a value of 1. When the components do not line up along the dotted line marked as the Steiner placement length (as in both scenarios A and B), then the placement_ratio is greater than 1. The more the path strays from the Steiner placement length dashed line shown in FIG. 4, the greater the value of placement_ratio. The maximum_placement_ratio is the largest placement_ratio within a grid 220 among the paths including candidate interconnects 210. As EQ. 3 indicates, when the placement_ratio is the maximum_placement_ratio (for a given path in a grid 220), the corresponding p_metric is 1. When the placement_ratio is not the maximum_placement_ratio (and is, therefore, necessarily a value smaller than the maximum_placement_ratio), then the corresponding p_metric is less than 1. Thus, like t_metric, p_metric is a value of 1 or less. As detailed above, by using the highest_failure_amount and maximum_placement_ratio in the calculation of t_metric and p_metric, respectively, t_metric and p_metric are normalized values.

As EQ. 1 indicates, t_metric is associated with scaling factor $\text{scaling}_t$, and p_metric is associated with scaling factor $\text{scaling}_p$. The scaling factors are given by:

$$\text{scaling}_t + \text{scaling}_p = 1 \quad [\text{EQ. 5}]$$

The scaling factors are used to weight t_metric and p_metric independently. The scaling factors may be changed as the integrated circuit design moves from the early stages to later stages close to finalization of the design. This is because the scaling factors affect the score of a given candidate interconnect 210, and the influence of the possibility of improving timing through placement modifications may diminish over the design life. That is, for example, early in the design process, the placement of components may be more fluid and $\text{scaling}_p$ may be smaller than $\text{scaling}_t$ to reflect that the score should not be high for a candidate interconnect 210 that is affected by placement issues and may, therefore, benefit from placement modification rather than layer promotion. In that early period, the t_metric would be weighted more heavily. Later in the design process, the placement of components may be relatively more fixed based on meeting all the other requirements of the design. In this case, the value of $\text{scaling}_p$ relative to $\text{scaling}_t$ may be increased (e.g., to be equal to $\text{scaling}_t$) in recognition of the fact that timing deficiencies of candidate interconnects 210 resulting from poor placement may no longer be addressable through placement changes and may warrant layer promotion instead. While the specific embodiments for defining and calculating t_metric, p_metric, and the scaling factors may be changed, the underlying considerations are to limit the number of interconnects 210 that are promoted based on congestion and to limit according to a ranking among the candidate interconnects 210 identified for layer promotion.

Technical effects and benefits include congestion aware layer promotion that manages candidate interconnects 210 according to their relative need and expected benefit from layer promotion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system to manage layer promotion in a routing phase of integrated circuit design, the system comprising:
    a memory device configured to store instructions; and
    a processor configured to execute the instructions to identify a set of candidate interconnects for layer promotion, score and sort the set of candidate interconnects according to a respective score to thereby establish a respective rank, assess routing demand and resource availability based on layer promotion of the set of candidate interconnects, and manage the set of candidate interconnects based on the respective rank and the resource availability, the processor assessing the routing demand and resource availability and managing the set of candidate interconnects iteratively, wherein the processor, in at least one iteration, generates a second set of candidate interconnects by reducing the set of candidate interconnects, wherein the processor scores the set of candidate interconnects based on determining, for each candidate interconnect of the set of candidate interconnects, an amount of time by which the candidate interconnect exceeds a timing requirement and a degree to which a length of a path including the candidate interconnect exceeds a minimum possible length of the path, and the processor scores the set of candidate interconnects based on calculating, for the respective candidate interconnect, a score given by:

$$\text{score} = \text{scaling}_t * \text{t\_metric} + \text{scaling}_p * \text{p\_metric},$$

where $\text{scaling}_t$ and $\text{scaling}_p$ are scaling factors, t_metric relates to the amount of time by which the candidate interconnect exceeds the timing requirement, and p_metric relates to the degree to which the length of the path including the candidate interconnect exceeds the minimum possible length of the path.

2. The system according to claim 1, wherein the processor assesses the routing demand and the resource availability based on determining congestion in a higher layer based on hypothetical promotion of the set of candidate interconnects to the higher layer, the higher layer being further from devices than a current layer of the set of candidate interconnects.

3. The system according to claim 2, wherein the processor determines a number of the set of candidate interconnects that may form the second set of candidate interconnects based on the congestion.

4. The system according to claim 2, wherein the processor scores and sorts the set of candidate interconnects, assesses the routing demand and the resource availability, and manages the set of candidate interconnects on a per-grid basis.

5. The system according to claim 1, wherein t_metric is given by:

$$\frac{failure\_amount}{highest\_failure\_amount},$$

where failure_amount is the amount of time by which the candidate interconnect exceeds the timing requirement, and highest_failure_amount is a highest amount of time by which any candidate interconnect of the set of candidate interconnects in a same grid as the candidate interconnect exceeds a respective timing requirement.

6. The system according to claim 1, wherein the p_metric is given by:

$$\frac{placement\_ratio}{maximum\_placement\_ratio},$$

where placement_ratio indicates the degree to which the length of the path including the candidate interconnect exceeds the minimum possible length of the path, and maximum_placement_ratio indicates a largest placement_ratio determined for any any candidate interconnect of the set of candidate interconnects in a same grid as the candidate interconnect.

* * * * *